United States Patent
Muralidhar et al.

(10) Patent No.: US 7,350,031 B2
(45) Date of Patent: Mar. 25, 2008

(54) MECHANISM FOR AUTOMATIC BACKUPS IN A MOBILE SYSTEM

(75) Inventors: Rajeev Muralidhar, Bangalore (IN); Rohit Idgunji, Bangalore (IN); Chris Lord, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 361 days.

(21) Appl. No.: 11/168,205

(22) Filed: Jun. 28, 2005

(65) Prior Publication Data

US 2006/0294198 A1  Dec. 28, 2006

(51) Int. Cl.
*G06F 12/00* (2006.01)
(52) U.S. Cl. .................. 711/143; 711/152
(58) Field of Classification Search ........... 711/118, 711/141, 142, 143, 162
See application file for complete search history.

(56) References Cited

U.S. PATENT DOCUMENTS

| 6,381,674 B2 * | 4/2002 | DeKoning et al. .......... 711/113 |
| 6,678,788 B1 * | 1/2004 | O'Connell .................. 711/114 |
| 2006/0294198 A1 * | 12/2006 | Muralidhar et al. ........ 709/217 |

* cited by examiner

*Primary Examiner*—Brian Peugh
(74) *Attorney, Agent, or Firm*—Blakely, Sokoloff, Taylor & Zafman LLP

(57) ABSTRACT

According to one embodiment, a system is disclosed. The system includes a first processor to operate a host system and a chipset, coupled to the first processor and the hard disk drive to operate an embedded system. The first processor includes a first file cache to maintain updates to one or more files at a storage medium and a first cache manager (CM) to control the updates to the first file cache. The second processor includes a second file cache to maintain the updates to the one or more files and a second CM to control the updates to the second file cache.

23 Claims, 4 Drawing Sheets

US 7,350,031 B2

MECHANISM FOR AUTOMATIC BACKUPS IN A MOBILE SYSTEM

FIELD OF THE INVENTION

The present invention relates to computer systems; more particularly, the present invention relates to mobile computer systems.

BACKGROUND

Mobility is crucial to modern organizations, and thus growing exponentially. Various estimates indicate that there will soon be approximately 100 million mobile devices in corporate environments. However, mobility challenges the IT departments of companies in their use of corporate resources. Mobile workers desire the same access to data as traditional workers, both when present physically within the corporate premises (through wired/wireless corporate networks), as well as from public access points like wireless hot spots, etc Mobility brings forth new challenges, both in managing portable devices like laptops from a security standpoint as well as protecting valuable data in laptops in the event of data loss/thefts. Traditional approaches to backups have included manual backups which are entirely on the owner's prerogative, and providing for backups with additional writeable media. These methods are not reliable, and possible theft of such media will exacerbate the condition. In addition, mobile users are usually connected to a corporate network irregularly and infrequently. Such connections could also be via low bandwidth dial up networks, or corporate/public wireless access points.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
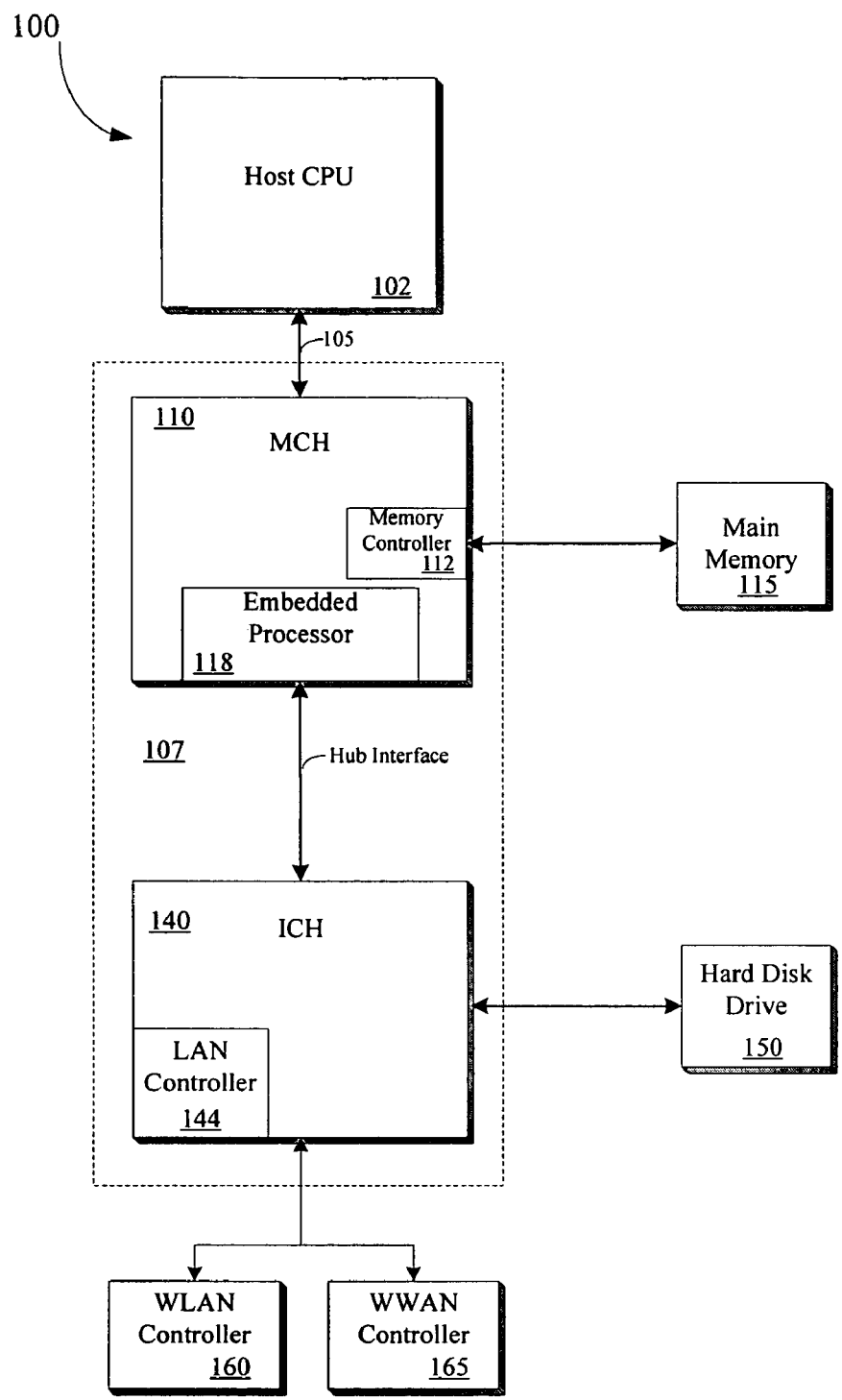
FIG. 1 is a block diagram of one embodiment of a computer system.

A mechanism for automated backups between cache memories is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif.

Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 also includes an auxiliary processor (or embedded processor (EP)) 118. In one embodiment, embedded processor 118 includes a complete operating system, networking stack and is implemented to communicate with CPU 102 (herein referred to as Host processor) via a proprietary interface. The system which runs on embedded processor 118 is henceforth termed the EP system.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a local area network (LAN) controller 144 that provides connectivity to a local area network. Further, ICH 140 is coupled to a wireless LAN (WLAN) controller 160 and a wireless wide area network (WWAN) controller 165. In addition, a hard disk drive 150 is coupled to ICH 140 to store data. Although shown as having an internal LAN controller and external WLAN and WWAN controllers, in other embodiments, one or both of WLAN controller 160 and WWAN controller 165 may also be located within ICH 140.

In one embodiment, computer system 100 is a client computer system, which provides a framework for organizing client data in the form of a two-level file cache system that implements efficient caching policies and intelligently performs backups during periods of connection to a corporate network. In such an embodiment, a communication mechanism is place between the Host and EP systems. Further, both the Host and EP systems may connect to a network (e.g., corporate/public network) via the controllers 144, 160 and 165.

Figure 2:
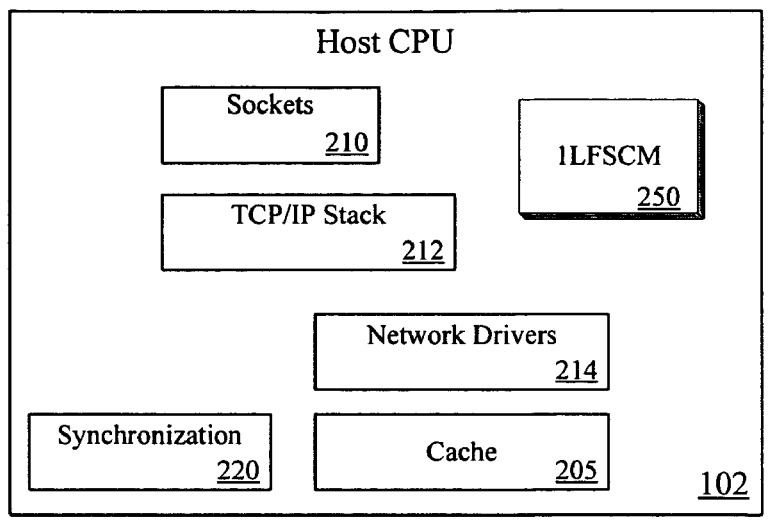
FIG. 2 illustrates one embodiment of a Host CPU.

FIG. 2 illustrates one embodiment of Host CPU 102. CPU 102 includes file cache 205, sockets 210, TCP/IP stack 212, network drivers 214 and a first level file system cache manager (1LFSCM) 250. 1LFSCM 250 operates as a cache manager that monitors file cache 205 of the Host operating system, and tracks file usages by a user. Further, 1LFSCM 250 provides for the user of the system 100 to indicate which files are important and need to be backed up frequently.

Figure 3:
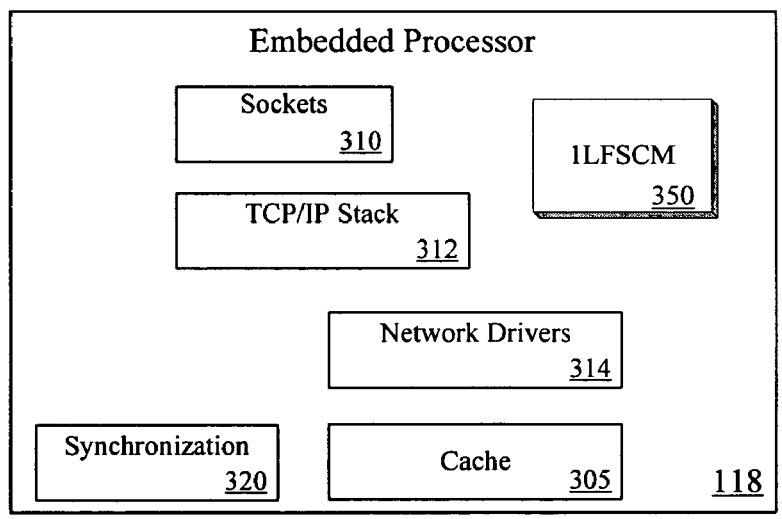
FIG. 3 illustrates one embodiment of an embedded processor.

FIG. 3 illustrates one embodiment of EP 118, which also includes a file cache 305, sockets 310, TCP/IP stack 312, network drivers 314 and a second level file system cache manager (2LFSCM) 350. 2LFSCM 350 provides a second level of cache management. Along with 1LFSCM 250, 2LFSCM 350 tracks file usages and file writes. In one embodiment, an EP-accessible memory area (NVRAM, etc.) can be used as 2LFSCM 350 so that when the Host system is in standby or hibernate mode, a system hard disk 150 need not be accessed for performing the desired backup during periods of connection to the network.

According to one embodiment, CPU 102 and EP 118 include synchronization units 220 and 320, respectively (See FIGS. 2 and 3). Synchronization units 220 and 230 implement a cache management protocol to ensure that caches 205 and 305 are synchronized, and identify correct images of the file modifications. In such an embodiment, each synchronization unit accesses a shared area in main memory 115 designated for synchronization.

In another embodiment, a first level write-back cache may notify 2LFSCM 350 when necessary (e.g., when the cache is full) in order to initiate synchronization. In yet a further embodiment, a write-through first level cache may always notify the 2LFSCM 350 of modified blocks.

According to one embodiment, when system 100 is not connected to a network, a user may update important files that are stored on a hard disk 150 until a connection to a network is established. Before computer system 100 is connected to the network both caches become full with "dirty" file blocks that identify the modifications to the updated files. In such an embodiment, if system 100 goes on standby or hibernate, the EP system may establish a connection to the network. As a result, the second level cache on the EP system will be backed up. Note that the dirty blocks on the first level cache and hard disk 150 will get updated when the system subsequently wakes up.

Referring back to FIG. 2, 1LFSCM 250 may be implemented as a combination of a user mode component and a kernel mode component. For instance, a simple user interface allows the user to indicate which files/directories are important and have to be backed up during periods of connection to the corporate network. The period for the backups can also be a specified parameter.

Further, 1LFSCM 250 will track file usage by the user (e.g., reads do not require any processing, but writes are monitored). A write to a file that has been specified as important is backed up (as per a specified periodicity). If there are file writes to any important files, 1LFSCM 250 will mark the file blocks as "dirty". Depending on the cache management protocol implemented, a 2LFSCM 350 in the EP system will get notified of these dirty blocks as well If the host is connected to the network, 1LFSCM 250 contacts a backup server depending on a specified backup periodicity. In one embodiment, message exchange with the 2LFSCM 350 include keep alive messages and messages indicating when the host is going into or coming out of Standby/Hibernate mode When the host is going into Standby/Hibernate, 1LFSCM 250 will write-back its cache of dirty file blocks to 2LFSCM 350.

If cache 305 is full of dirty file blocks, the updated file blocks are stored on hard disk 150 and will not be backed up until the system comes out of standby/hibernation and resumes its connection to the network. The implementation of this mechanism also depends on the sizes of the two caches, which is implementation-specific. When the host comes out of a low power state such as Standby/Hibernate, 1LFSCM 250 will update its state with 2LFSCM 350 through the cache management protocol and resume the backup operations.

Referring back to FIG. 3, 2LFSCM 350 is initialized during system startup and will remain functioning through all of the host system's power states, including Standby/Hibernate. Keep alive messages are exchanged with 1LFSCM 250. When the Host is going into Standby/Hibernate mode, this 2LFSCM 350 will get notified.

Further, depending on the cache management protocol implemented, 2LFSCM 350 will get notified when there are any dirty blocks in the file system that need to be backed up. If the host is in complete functional state, 1LFSCM 250 will ensure the backup is performed (depending on the periodicity). If the host is in Standby/Hibernate mode, 2LFSCM 350 checks to determine if it is connected to the network. If so, it contacts the backup server and performs the backup of the modified files.

Figure 4:
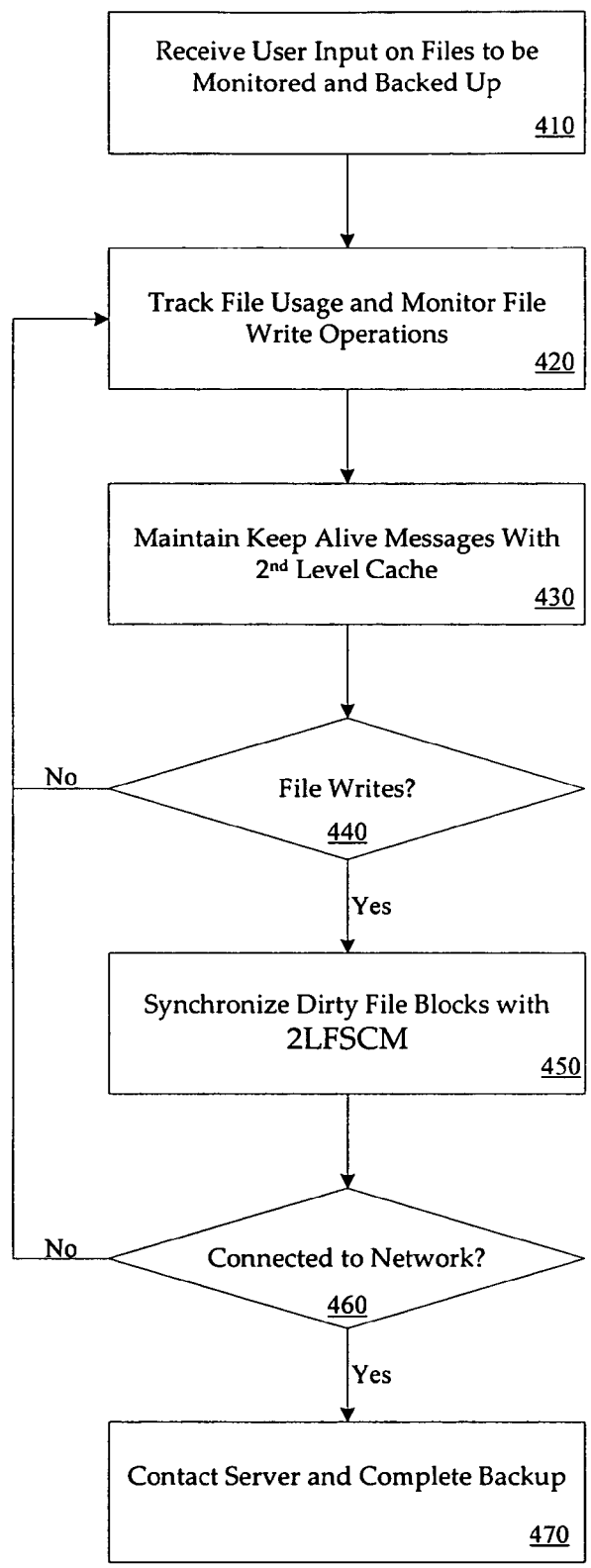
FIG. 4 is a flow diagram illustrating functionality of a first level cache manager.

FIG. 4 is a flow diagram illustrating functionality of 1LFSCM 250. At processing block 410, 1LFSCM 250 receives user input indicating which files are to be monitored and backed up. At processing block 420, file usage is tracked and file write operations are monitored. At processing block 430, Keep Alive messages are maintained with 2LFSCM 350.

At decision block 440, it is determined whether file writes have occurred. If no file writes have occurred, control is returned to processing block 420 where file usage is tracked and file write operations are monitored. If file writes have occurred, dirty file blocks are synchronized with 2LFSCM 350 (e.g., can implement block writes, write-through, etc.), processing block 450.

At decision block 460, it is determined whether computer system 100 is connected to a network. If not connected to a network, control is returned to processing block 420 where file usage is tracked and file write operations are monitored. If connected to a network, a backup server is contacted, a write back of dirty file blocks is performed and the backup is completed, processing block 470.

Figure 5:
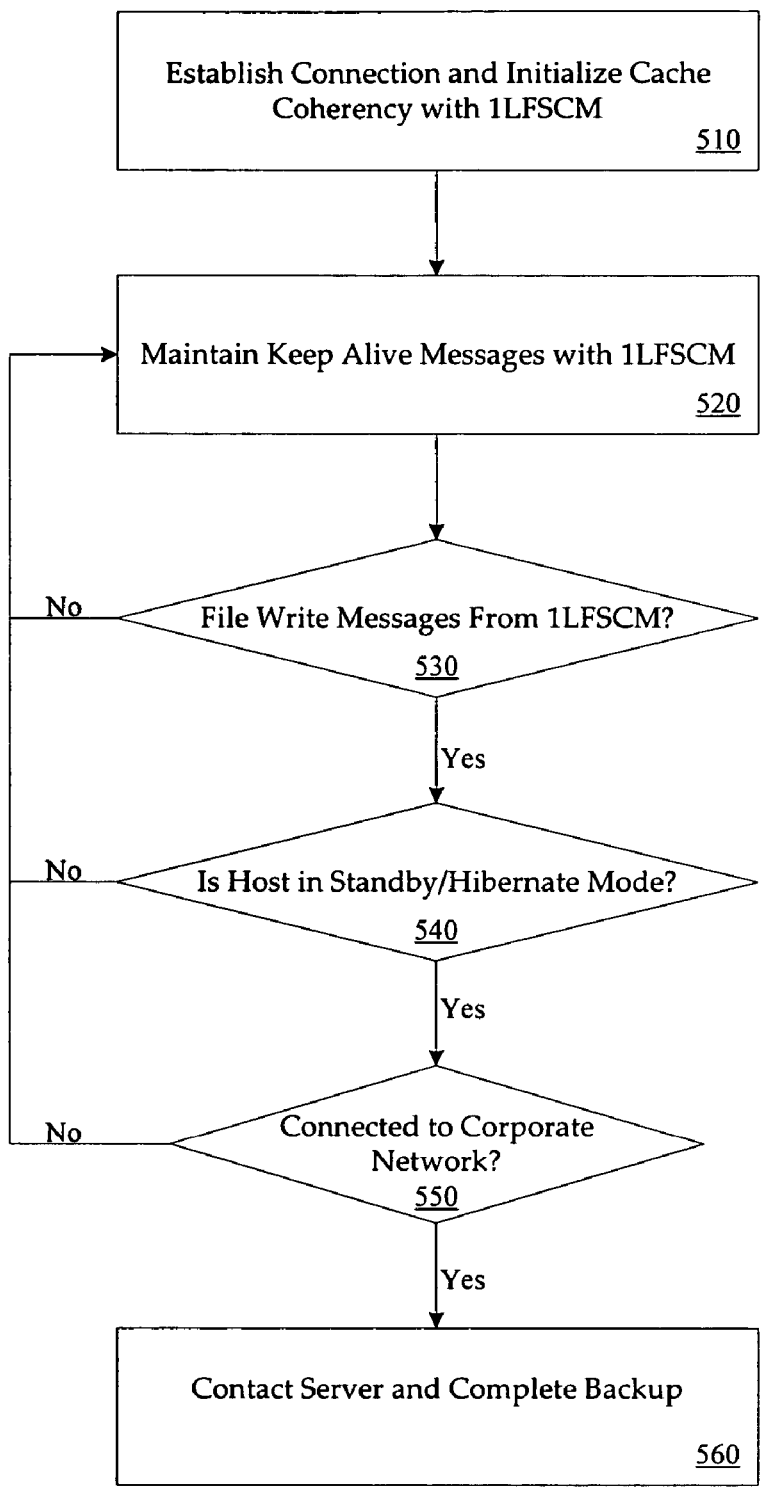
FIG. 5 is a flow diagram illustrating functionality of a second level cache manager.

FIG. 5 is a flow diagram illustrating functionality of 2LFSCM 350. At processing block 510, a connection with 1LFSCM 250 is established, and cache coherency is initialized. At processing block 520, keep alive messages with 1LFSCM 250 are maintained. At decision block 530, it is determined whether file write messages have been received from 1LFSCM 250.

If no file write messages have been received, control is returned to processing block 520, where keep alive messages with 1LFSCM 250 are maintained. If file write messages have been received, it is determined whether the Host is in the Standby/Hibernate mode, decision block 540. If the Host is not in the Standby/Hibernate mode, control is returned to processing block 520, where keep alive messages with 1LFSCM 250 are maintained.

If the Host is in the Standby/Hibernate mode it is determined whether computer system 100 is connected to a network, decision block 550. If not connected to a network, control is again returned to processing block 520 where keep alive messages with 1LFSCM 250 are maintained. If connected to a network, the backup server is contacted, a write back of dirty file blocks is performed and the backup is completed, processing block 560.

The two-level caching mechanism described above automates the backup process, requiring minimal user intervention. Thus, a mobile user is able to transparently backup important data while being connected seamlessly across wired or wireless connections, even when the Host is on standby or hibernate mode. Further, designated content may be selectively backed up, which is transparent to a user and host system across host sleep cycles. Also, a systems administrator may update/patch a file on a hard disk, or a block on a hard disk. The update can be pushed to the second level cache for storage and then the first level cache will write it to disk after the host restarts.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   a first processor to operate a host system, the first processor having:
      a first file cache to store updates to a first copy of one or more files at a storage medium; and
      a first cache manager (CM) to control the updates to the first file cache; and
   a chipset, coupled to the first processor, having a second processor to operate an embedded system, the second processor having:
      a second file cache to store updates to a second copy of the one or more files; and
      a second CM to control the updates to the second file cache.

2. The system of claim 1 wherein the first CM marks the updates to the first file cache as dirty blocks.

3. The system of claim 2 wherein the first CM and the second CM each comprise a synchronization unit to maintain synchronization between the first file cache and the second file cache by transferring the updated files from the first file cache to the second file cache.

4. The system of claim 3 wherein synchronization between the first file cache and the second file cache is initiated when the first file cache is filled with updates.

5. The system of claim 3 wherein synchronization between the first file cache and the second file cache is initiated whenever the first file cache is modified.

6. The system of claim 3 wherein synchronization between the first file cache and the second file cache is initiated whenever the host system is to enter a low power state.

7. The system of claim 3 wherein the first CM facilitates transmission of the file updates from the first file cache to a backup server whenever the host system is operating in a normal power state.

8. The system of claim 7 wherein the second CM facilitates transmission of the file updates from the second file cache to the backup server whenever the host system is operating in a low power state.

9. The system of claim 8 wherein the dirty blocks in the first file cache is updated after the host system has exited the low power state.

10. The system of claim 1 wherein the first CM retrieves information from a user interface indicating files having high priority that are to be frequently backed up.

11. A method comprising:
    modifying a file at a hard disk on a computer system;
    updating a first copy of the file at a first file cache;
    updating a second copy of the file at a second file cache by synchronizing the first file cache with the second file cache at predetermined intervals; and
    saving a copy of the modified file at a backup server by transmitting the updated second copy of the file to a backup server via a network if the computer system is coupled to the network.

12. The method of claim 11 further comprising:
    receiving a user input at a first cache manager indicating that the file is to be monitored by the first cache manager; and monitoring modifications to the first file at the first cache manager.

13. The method of claim 12 wherein synchronization between the first file cache and the second file cache is initiated whenever the first cache manager and the first file cache are to enter a low power state.

14. The method of claim 11 wherein synchronization between the first file cache and the second file cache is initiated whenever the first copy of the file is updated at the first file cache.

15. The method of claim 11 wherein synchronization between the first file cache and the second file cache is initiated when the first file cache is filled with updates to a multitude of modified files.

16. The method of claim 11 further comprising:
determining if the first file cache is subject to a low power state; and
saving a copy of the modified file at the backup server by transmitting the updated first copy of the file to the backup server if the first file cache is not subject to a low power state.

17. A system comprising:
a hard disk drive;
a first processor to operate a host system, the first processor having:
a first file cache to store updates to a first copy of one or more files at the hard disk drive; and
a first cache manager (CM) to control the updates to the first file cache; and
a chipset, coupled to the first processor and the hard disk drive, having a second processor to operate an embedded system, the second processor having:
a second file cache to store updates to a second copy of to the one or more files; and
a second CM to control the updates to the second file cache.

18. The system of claim 17 wherein the first CM and the second CM each comprise a synchronization unit to maintain synchronization between the first file cache and the second file cache by transferring the updated files from the first file cache to the second file cache.

19. The system of claim 18 wherein the first CM facilitates transmission of the file updates from the first file cache to a backup server whenever the host system is operating in a normal power state.

20. The system of claim 19 wherein the second CM facilitates transmission of the file updates from the second file cache to the backup server whenever the host system is operating in a low power state.

21. An article of manufacture including one or more computer readable media that embody a program of instructions, wherein the program of instructions, when executed by a processing unit, causes the processing unit to perform the process of:
modifying a file at a hard disk on a computer system;
updating a first copy of the file at a first file cache;
updating a second copy of the file at a second file cache by synchronizing the first file cache with the second file cache at predetermined intervals; and
saving a copy of the modified file at a backup server by transmitting the updated second copy of the file to a backup server via a network if the computer system is coupled to the network.

22. The article of manufacture of claim 21 wherein the program of instructions, when executed by a processing unit, further causes the processing unit to perform the process of:
receiving a user input at a first cache manager indicating that the file is to be monitored by the first cache manager; and
monitoring modifications to the first file at the first cache manager.

23. The article of manufacture of claim 21 wherein synchronization between the first file cache and the second file cache is initiated whenever the first copy of the file is updated at the first file cache.

* * * * *